US012688722B2

(12) United States Patent　　　　　(10) Patent No.:　US 12,688,722 B2

Kumar et al.　　　　　　　　　　　　(45) Date of Patent:　　Jul. 21, 2026

(54) SIMULATION OF LABEL DATA TO OPTIMIZE THE VISUAL DOCUMENT UNDERSTANDING BY USING PDFs ANNOTATION AWARE METHODOLOGY

(71) Applicant: Dell Products L.P., Round Rock, TX (US)

(72) Inventors: Atul Kumar, Bangalore (IN); Adya Jha, Bengaluru (IN); Saurabh Jha, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 356 days.

(21) Appl. No.: 18/462,972

(22) Filed: Sep. 7, 2023

(65) Prior Publication Data

US 2025/0087005 A1　　Mar. 13, 2025

(51) Int. Cl.
G06V 30/19　　　(2022.01)
G06T 5/70　　　(2024.01)
G06T 7/13　　　(2017.01)

(52) U.S. Cl.
CPC .......... G06V 30/19147 (2022.01); G06T 5/70 (2024.01); G06T 7/13 (2017.01); G06V 30/19133 (2022.01)

(58) Field of Classification Search
None
See application file for complete search history.

(56) References Cited

U.S. PATENT DOCUMENTS

| | | | |
|---|---|---|---|
| 8,938,118 B1 * | 1/2015 | Jain | G06V 30/18086 382/159 |
| 11,321,956 B1 * | 5/2022 | Geng | G06V 30/414 |
| 11,341,758 B1 * | 5/2022 | Stoltenberg | G06N 3/084 |
| 2013/0251249 A1 * | 9/2013 | Huo | G06V 30/19173 382/161 |
| 2015/0278162 A1 * | 10/2015 | Korneev | G06V 30/418 707/690 |
| 2017/0344583 A1 * | 11/2017 | Nakatsuka | G06F 16/258 |
| 2018/0114142 A1 * | 4/2018 | Mueller | G06F 16/906 |
| 2022/0284721 A1 * | 9/2022 | Wu | G06V 30/18057 |
| 2024/0062569 A1 * | 2/2024 | Mittal | G06V 10/82 |
| 2024/0127617 A1 * | 4/2024 | Amamou | G06V 30/19133 |
| 2024/0160838 A1 * | 5/2024 | Anoun | G06V 30/416 |

OTHER PUBLICATIONS

Zi G. Groundtruth generation and document image degradation. University of Maryland, College Park; 2005. (Year: 2005).*

* cited by examiner

*Primary Examiner* — Michelle M Entezari Hausmann
(74) *Attorney, Agent, or Firm* — Workman Nydegger

(57)　　　　ABSTRACT

One example method includes obtaining a text-based document, identifying annotations in the text-based document, and retaining those annotations, converting the text-based document to an image, processing the image, creating simulated label data by integrating the processed image with the annotations, and using the processed simulated label data to train a machine learning model of an OCR (optical character recognition) system. The processed image is a lower quality version of the text-based document that was used to create the image.

20 Claims, 7 Drawing Sheets

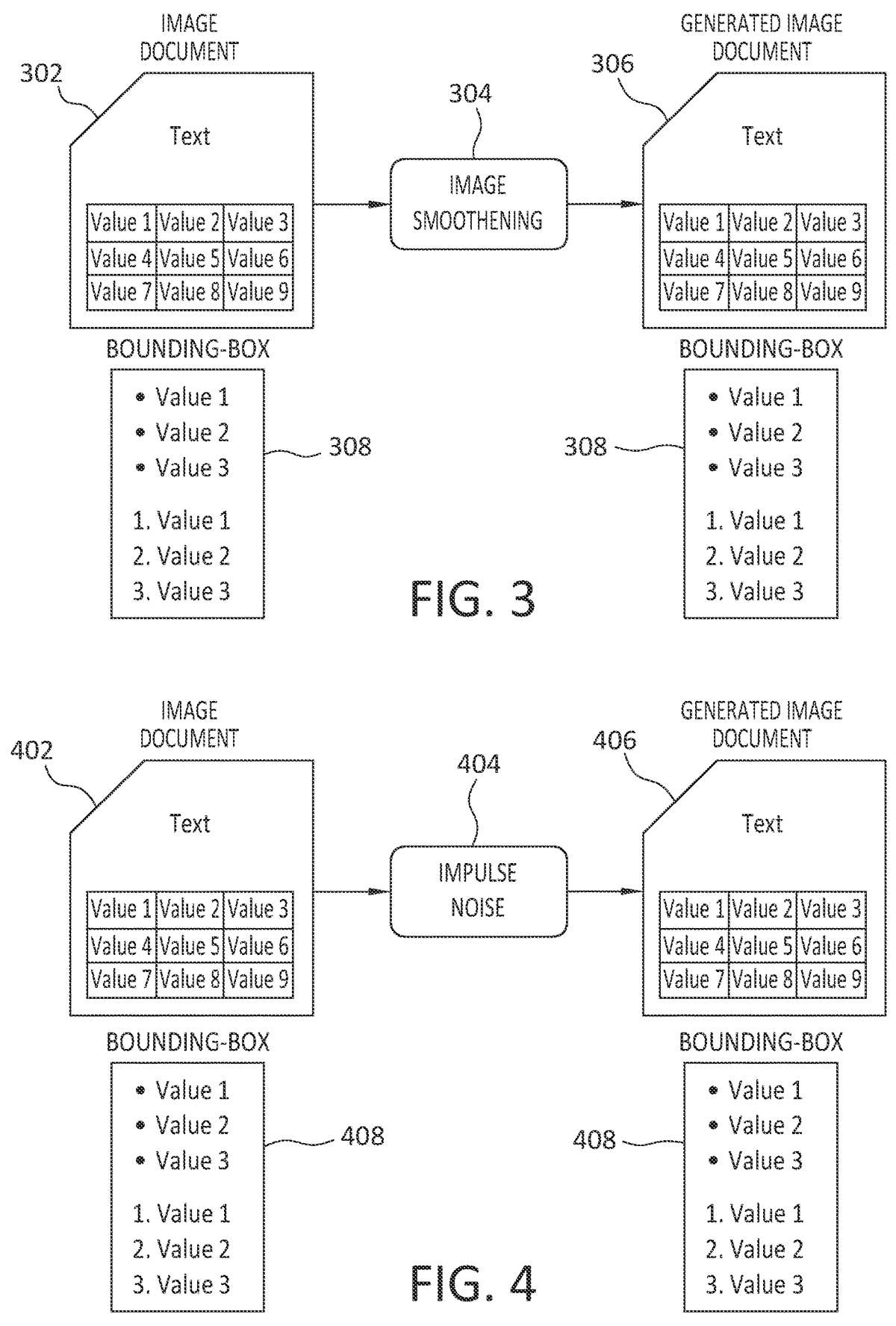

IMAGE
DOCUMENT

302

Text

| Value 1 | Value 2 | Value 3 |
|---------|---------|---------|
| Value 4 | Value 5 | Value 6 |
| Value 7 | Value 8 | Value 9 |

304

IMAGE
SMOOTHENING

GENERATED IMAGE
DOCUMENT

306

Text

| Value 1 | Value 2 | Value 3 |
|---------|---------|---------|
| Value 4 | Value 5 | Value 6 |
| Value 7 | Value 8 | Value 9 |

BOUNDING-BOX

- Value 1
- Value 2
- Value 3

1. Value 1
2. Value 2
3. Value 3

308

BOUNDING-BOX

308

- Value 1
- Value 2
- Value 3

1. Value 1
2. Value 2
3. Value 3

FIG. 3

IMAGE
DOCUMENT

402

Text

| Value 1 | Value 2 | Value 3 |
|---------|---------|---------|
| Value 4 | Value 5 | Value 6 |
| Value 7 | Value 8 | Value 9 |

404

IMPULSE
NOISE

GENERATED IMAGE
DOCUMENT

406

Text

| Value 1 | Value 2 | Value 3 |
|---------|---------|---------|
| Value 4 | Value 5 | Value 6 |
| Value 7 | Value 8 | Value 9 |

BOUNDING-BOX

- Value 1
- Value 2
- Value 3

1. Value 1
2. Value 2
3. Value 3

408

BOUNDING-BOX

408

- Value 1
- Value 2
- Value 3

1. Value 1
2. Value 2
3. Value 3

FIG. 4

SIMULATION OF LABEL DATA TO OPTIMIZE THE VISUAL DOCUMENT UNDERSTANDING BY USING PDFs ANNOTATION AWARE METHODOLOGY

FIELD OF THE INVENTION

Embodiments of the present invention generally relate to the training of machine learning (ML) models. More particularly, at least some embodiments of the invention relate to systems, hardware, software, computer-readable media, and methods, for generating synthetic data with which to train an ML model.

BACKGROUND

Visual document understanding involves the task of extracting information from digital documents, such as invoices and purchase orders for example, by analyzing their layout and structure. This process, sometimes referred to as Document Layout Analysis (DLA), involves multi-level detection techniques ranging from character-level, to paragraph-level, detection. Deep learning has been utilized to solve the problem of information extraction from unstructured documents with varying layouts, such as scanned documents or invoices with different layouts from various customers. However, deep learning models require high-quality data for training, and obtaining such data can be challenging.

In more detail, existing approaches to improving the accuracy of OCR (optical character recognition) systems typically involve using pre-existing datasets of scanned documents or images to train the system. However, these datasets are often limited in their diversity and may not accurately represent the various document layouts and languages that are encountered in real-world scenarios.

Further, existing approaches to OCR accuracy may involve applying heuristic methods or manual corrections to improve recognition accuracy. However, these methods are time-consuming and may not scale well for large datasets.

Finally, some conventional approaches may only focus on improving OCR accuracy for specific types of documents or languages. However, this limits the flexibility of these approaches.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 3 discloses aspects of an example image document smoothening process according to one embodiment.

FIG. 4 discloses aspects of an example of salt-and-pepper noise generation and handling, according to one embodiment.

DETAILED DESCRIPTION OF SOME EXAMPLE EMBODIMENTS

Figure 1:
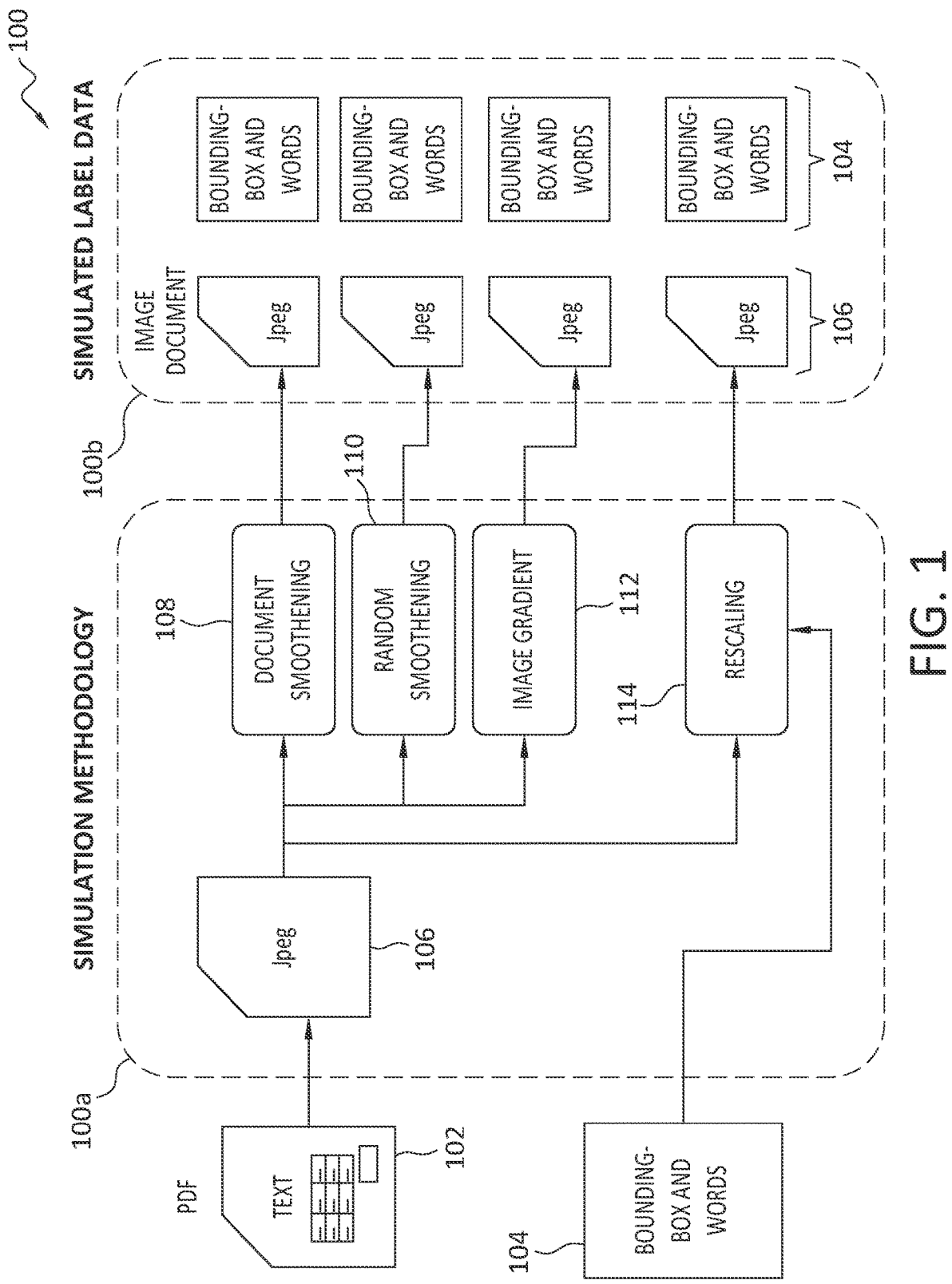
FIG. 1 discloses an overview of aspects of an example embodiment.

Embodiments of the present invention generally relate to the training of machine learning (ML) models. More particularly, at least some embodiments of the invention relate to systems, hardware, software, computer-readable media, and methods, for generating synthetic data with which to train an ML model.

A method according to one embodiment of the invention may comprise various operations. One particular example method begins with obtaining a text-based document, such as a text-based PDF document for example, that includes annotations, that is, a document that is not simply an image file, but which comprises text and/or other features that can be selected and copied by a user using an input device, such as a mouse for example. The annotations in the text-based PDF (portable document file) document may comprise, for example, bounding boxes, manually drawn by a human, around text and/or other features in the text-based document. These annotations may be extracted from the text-based PDF document to create a training dataset for an OCR (optical character recognition) system, which may comprise, or take the form of, an ML (machine learning) model. The training dataset may then be used to train the OCR system to recognize the text in the document in the text-based document. Finally, the trained OCR system may be used to analyze image-based documents, which may comprise low-quality text, noise, and a variety of layouts, to improve, relative to conventional approaches at least, text recognition accuracy.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s).

Finally, it is not required that any embodiment implement any of the advantageous and unexpected effects disclosed herein.

In particular, one advantageous aspect of an embodiment of the invention is that text may be recognized in an image even if the image includes poor quality text, with various different layouts. An embodiment may be able to recognize text in various different languages. Various other advantages of one or more example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Overview

The ability to accurately extract text from images is important for many industries, including finance, healthcare, and government. However, image-based OCR systems often struggle with low-quality text and varied document layouts, leading to inaccuracies and errors in the extracted text. This can have serious consequences in fields like healthcare, where misreading important information on a patient medical record can lead to life-threatening mistakes.

Thus, an example embodiment of the invention may comprise a system and method which improve the accuracy of image-based OCR systems by generating synthetic annotated data from text-based PDF documents. By utilizing attention-aware methodology and deep learning architectures, the system may create diverse synthetic data with a wide range of document layouts and languages. The synthetic data generated by an embodiment of the invention may enable an OCR system to better recognize, and extract, text from image-based documents. This enhanced recognition may thus improve the overall accuracy of the OCR system.

In contrast with an embodiment of the invention, conventional OCR systems encounter difficulties in processing image-based documents that have low-quality text and varied layouts. However, an embodiment of the invention may address these challenges by creating diverse synthetic data with a wide range of document layouts and languages. In an embodiment, creation of synthetic data may be achieved by using annotations in text-based PDF documents to teach the OCR system to recognize annotations, such as highlighted or commented text, added by users.

One example embodiment may comprise various operations, including: obtaining a text-based PDF document that includes annotations; extracting the annotations, which may have been added by human operators, from the PDF document to create a training dataset for the OCR system; training the OCR system to recognize the text in the document; and applying the trained OCR system to image-based documents to improve recognition accuracy by the OCR system.

Advantageously, an example embodiment may be able to create synthetic data in multiple different human languages, so as to improve the accuracy of OCR systems on a wider range of documents. Additionally, an embodiment of the invention may not require specialized hardware or computing resources, making the improved OCR functionality accessible to a wider range of users.

Further, an example embodiment may have potential applications in various fields, including document scanning and indexing, information retrieval, and text-to-speech conversion. An embodiment of the invention may also be useful in the field of accessibility by making it easier for people with visual impairments to access and read image-based documents.

An example embodiment may comprise the use of annotations in text-based PDF documents to teach an OCR system to recognize highlighted or commented text, that is, annotations, added by users. The use of such annotations may enable a system according to one embodiment to learn from a wider range of data and better handle the variety of document layouts that the system may encounter in the real world.

Finally, an example embodiment may comprise a paradigm shift relative to conventional OCR approaches. In particular, by generating synthetic annotated data and utilizing attention-aware methodology and deep learning architectures, an embodiment of the invention may improve accuracy in OCR, reduce errors, and increase efficiency, all over a wide range of industries and applications.

B. General Aspects of One Example Embodiment

One particular example embodiment comprises a method for generating synthetic annotated data using pdf annotations to capture the distribution of documents from different customers, which may yield a diverse range of document layouts with text rendered in the background. In an embodiment, a method comprises obtaining a text-based PDF document and extracting the annotated data, which may be easier when dealing with PDFs which have not been generated by scanning a document, that is, text-based PDFs. The annotated data and the image, obtained from text based PDF, may then be used to create a training dataset for an OCR system. By training the OCR system using this dataset, the accuracy of the OCR system in recognizing text, especially in image-based or scanned documents with lower quality text, may be improved, at least relative to conventional approaches that do not employ the creation and/or use of synthetic data for OCR system training.

An example embodiment comprises a solution for obtaining high-quality training data for OCR systems, enabling such OCR systems to better recognize and extract information from digital documents with varying layouts and structures. Overall, an embodiment of the invention may significantly improve the accuracy of image-based OCR systems by leveraging a text-aware annotations system. This approach may be useful for a wide range of applications, including document scanning and indexing, information retrieval, and text-to-speech conversion.

C. Detailed Description of an Example Embodiment

An example embodiment of the invention may operate to improve the generation of annotated training data for training machine learning models in visual document understanding tasks. One example embodiment of the invention may comprise a two-stage process, that comprises [1] a Simulation Methodology section and [2] a Simulated Data Labels section. This embodiment focuses on using text-based PDFs, and their respective annotations, which may then be augmented to create a diverse set of labeled data, including bad quality images, to train robust models, such as OCR systems for example, for real-world document processing.

C.1 Simulation Methodology

This stage processes the input text-based PDFs and their associated annotations. In an embodiment, this stage may comprise the following operations:

[1] PDF conversion. Text-based PDFs, and their associated annotations, are converted into images to facilitate further processing and augmentation—this conversion may help to ensure that the system can apply various image processing techniques to generate diverse training data;

[2] Image augmentation. To create a diverse set of images, different augmentation techniques may be applied to the converted images—these techniques include, but are not limited to, smoothening, random smoothening, image gradient, and rescaling, and these transformations may help to simulate bad quality images that the machine learning models, such as may be incorporated into an OCR system for example, may encounter in real-world scenarios, thus enabling the models to generalize better when encountering images of poor quality; and

[3] Annotation augmentation. Alongside the image augmentation, the system May modify the respective annotations to match the bounding box size and position of the converted and augmented images—this may ensure that the annotations remain accurate and relevant, even after the various augmentation techniques have been applied to the converted images.

C.2 Simulated Data Labels

This stage of an embodiment of the invention receives the augmented images and annotations from the previous stage, that is, the simulation methodology stage, and generates the final annotated data for training the machine learning models. In an embodiment, this stage may comprise the following operations:

[1] Data Integration. The system integrates the augmented images and their respective annotations, ensuring that each image has the correct bounding box and label information;

[2] Data Verification. To maintain the quality of the training data, the system performs a verification step to confirm that the bounding boxes and labels are accurate and well-aligned with the corresponding image content; and

[3] Final Annotated Data. Once the verification is complete, the system compiles the augmented images and their respective annotations into a single dataset, which can be used to train machine learning models for tasks that require visual document understanding.

By leveraging a two stage approach according to one embodiment such as that just described, researchers and practitioners can efficiently generate diverse and representative training data, including low-quality images, to train robust models for visual document understanding tasks. This approach can lead to improved model performance and a higher degree of generalization in real-world applications.

C.3 Implementation Overview

With attention now to FIG. 1, aspects of an example implementation 100 of an embodiment that comprises [1] a Simulation Methodology section 100*a* and [2] a Simulated Data Labels section 100*b* is disclosed. As shown in FIG. 1, example inputs to a process and method according to one embodiment may comprise text-based PDFs 102, or other text-based documents example, and annotations 104 that have been made, such as by a human operator, to those text-based documents 102. Note that while reference is made herein to a text-based PDF, such reference is made is only by way of example, and the scope of the invention extends more generally to any text-based documents. In FIG. 1, the example annotations 104 includes bounding boxes, and words, that have been added by a human, such as by way of an input devices such as a mouse or light pen for example, to one or more of the text-based PDFs 102. Annotations 104 are not limited to bounding boxes and words, however, and the scope of the invention embraces more generally any kind of annotations that a human may be able to add to a text-based PDF using an input device, or other human/computer system interface.

As further indicated in FIG. 1, the text-based PDF, which may include annotations, may be converted to an image 106, such as by optical scanning for example. While no particular image format is required, an embodiment may use a .jpeg image format. The image 106 may be subjected to various processes including, but not limited to, document smoothening 108, random smoothening 110, image gradient processing 112, and rescaling 114. Likewise, the annotations 104 may be subjected to processing including, but not limited to, rescaling 114. Note that the annotations 104 may be obtained from the un-processed text-based PDF 102, and preserved for later use, as disclosed elsewhere herein.

After the simulation portion 100*a* of the example implementation 100 has been performed, the simulated label data portion 100*b* may be performed. As shown in FIG. 1, the simulated label data portion 100*b* may involve the integration of the annotations 104 with their respective images 106. Further details concerning the simulation portion 100*a* and the simulated label portion 100*b* are disclosed elsewhere herein.

C.4 Processing

One example embodiment of the invention may comprise various processes. These processes may include, for example: data preparation; document smoothening; random patch smoothening; lines and edges filter; rescaling; and, noise introduction. Note that [1] the aforementioned processes may be performed in any order, [2] any combination or grouping of one or more of these processes may be employed in an embodiment, and [3] none of these processes, or any subset of these processes, is required to be performed in any embodiment.

C.4.1 Data Preparation Process

Figure 2:
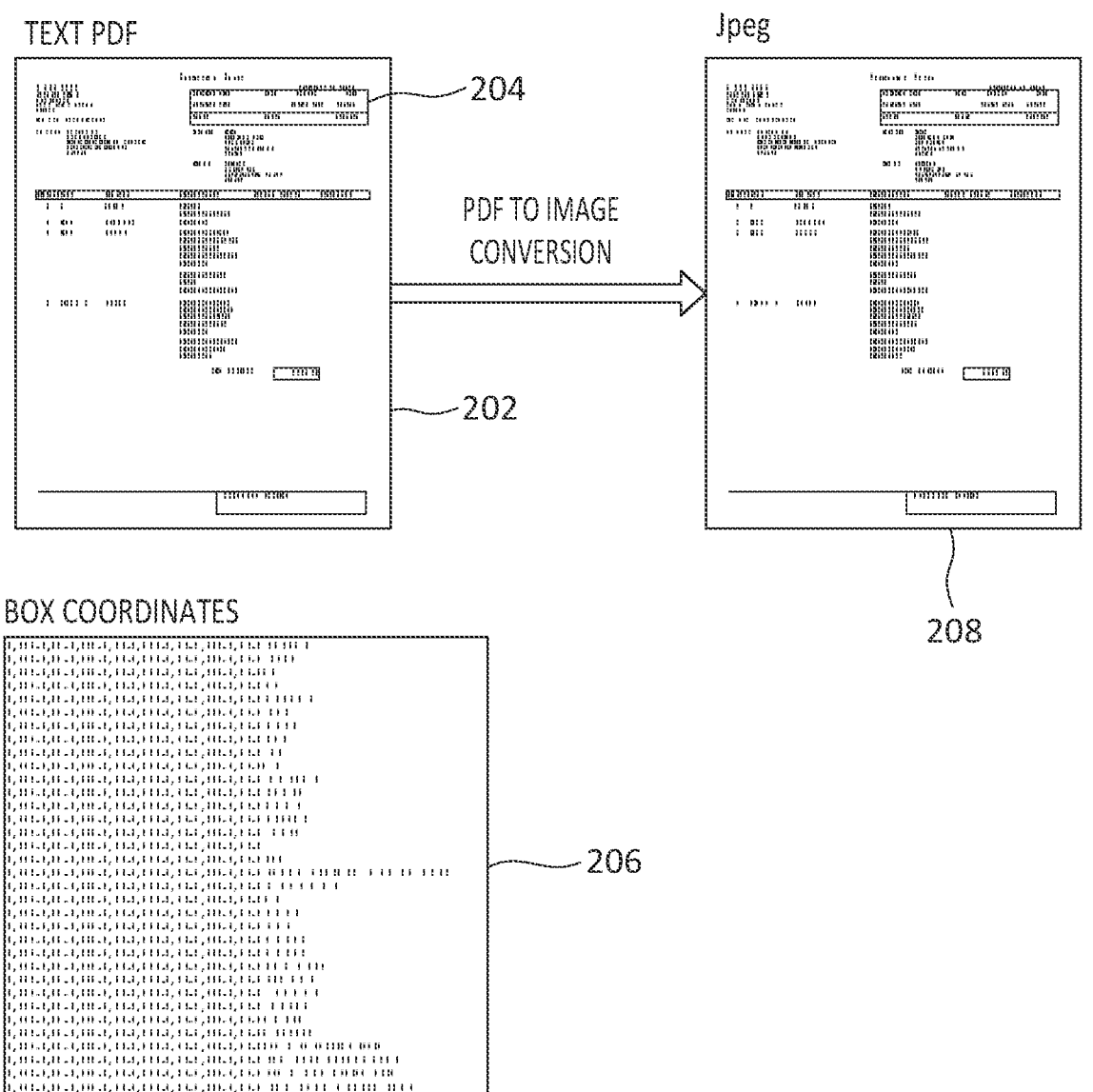
FIG. 2 discloses aspects of an example data preparation process according to one embodiment.

With attention now to FIG. 2, aspects of an example embodiment of a data preparation process are disclosed. A data preparation process may comprise collecting a diverse set of text-based PDFs 202 from various domains and sources, so as to help ensure that the dataset adequately represents real-world documents. Next, annotations 204, such as bounding box annotations for example, may be obtained for the text elements within these text-based PDFs 202 by leveraging the inherent structure and annotation capabilities of the text-based PDFs 202. In an embodiment, the bounding box 204 annotations may comprise, for example, two dimensional coordinates 206, within the text-based PDF 202, of the bounding boxes 204. In an embodiment, the bounding box(es) 204 may be drawn by a human operator around various portions of text of the text-based PDF 202. Obtaining the bounding box 204 annotations helps to preserve the contextual and semantic relationships between the document, that is, the text-based PDF 202, components.

Once the annotations 204 have been added to the text-based PDFs 202, the text-based PDFs 202 may then be converted into images 208. Various image processing and augmentation techniques may then be applied to the images 208. By combining the images 208, formed by converting the text-based PDFs 202, with their corresponding annotations 204 (see also, images 106 and annotations 104 in FIG. 1), an embodiment may create a comprehensive and diverse dataset for training ML models, such as may be employed in an OCR system. This data preparation process, which may emphasize maintenance of the semantic relationships between document elements and incorporating low-quality images, helps to ensure that the models trained with this dataset are both accurate and highly adaptable to real-world scenarios which may involve poor quality images, and other problems, in documents to be evaluated by an OCR system.

C.4.2 Document Smoothening Process

With attention now to FIG. 3, aspects of an example embodiment of a document smoothening process are disclosed. In an embodiment, document smoothening is an image processing technique which may be applied to the entire image (see 106 of FIG. 1, and 208 of FIG. 2) generated from the text-based PDFs (see 102 of FIG. 1, and 202 of FIG. 2) mentioned earlier. An aim of the document smoothening technique is to create variations in the image quality, so as to simulate the kind of noisy or low-quality images that may be encountered in real-world scenarios. A smoothening techniques applied to an image may be referred to herein as an 'image smoothening' technique.

As shown in FIG. 3, an image 302 of a document may be obtained, such as by way of the process disclosed in FIG. 2. An image smoothening process 304 may then be applied to the image 302 so as to generate an image document 306 that comprises a smoothened version of the image 302. In an embodiment, a combination of various methods, such as Gaussian blur, median filtering, or bilateral filtering, for example, may be used to create the new image 306 by reducing high-frequency noise and preserving the structures and boundaries within the document images, as shown at 308 where the bounding boxes and their respective text have been retained in the new image 306.

By incorporating document smoothening techniques in the data preparation process, an embodiment of the invention may help to ensure that the OCR ML models are trained on diverse and representative data. This may enable these models to learn how to handle various levels of image quality, ultimately improving their performance and generalization capabilities when applied to real-world document processing tasks C.4.3 Noise Introduction With attention now to FIG. 4, aspects of an example embodiment of a noise introduction process are disclosed. Introducing various types of noise into the generated images (see 306 in FIG. 3) may be a useful part of the data preparation process for visual document understanding tasks. The noise introduction process aims to simulate real-world scenarios, where documents can be affected by noise due to factors such as scanning, printing, or image compression.

As shown in FIG. 4, an image document 402 may be provided, such as an image document processed by the operations disclosed in FIGS. 2 and 3. A noise process 404, such as an impulse noising process for example, may be applied to the image document 402 so as to introduce impulse noise, sometimes referred to as 'salt-and-pepper' noise, into the image document 402 so as to generate an image document 406 that comprises a noised, or noisy, version of the image 402. Note that, notwithstanding application of the noise process 404, the structures and boundaries within the document images may be preserved, as shown at 408 where the bounding boxes and their respective text have been retained in the new image 406.

By training ML models on noisy images, an embodiment may improve the robustness and ability of the ML model to handle real-world challenges. To create a diverse and representative dataset, it may be useful to combine multiple noise types and levels, such as additive noise that affects all pixels, impulsive noise that randomly changes specific pixel values, multiplicative noise that models interference patterns, and noise that arises from the discrete nature of image sensor photon detection. Such a comprehensive approach may enable the ML models to learn how to handle various kinds of noise, ultimately improving their performance and adaptability in real-world document processing tasks.

C.4.4 Random Patch Smoothening

Figures 5, 6:
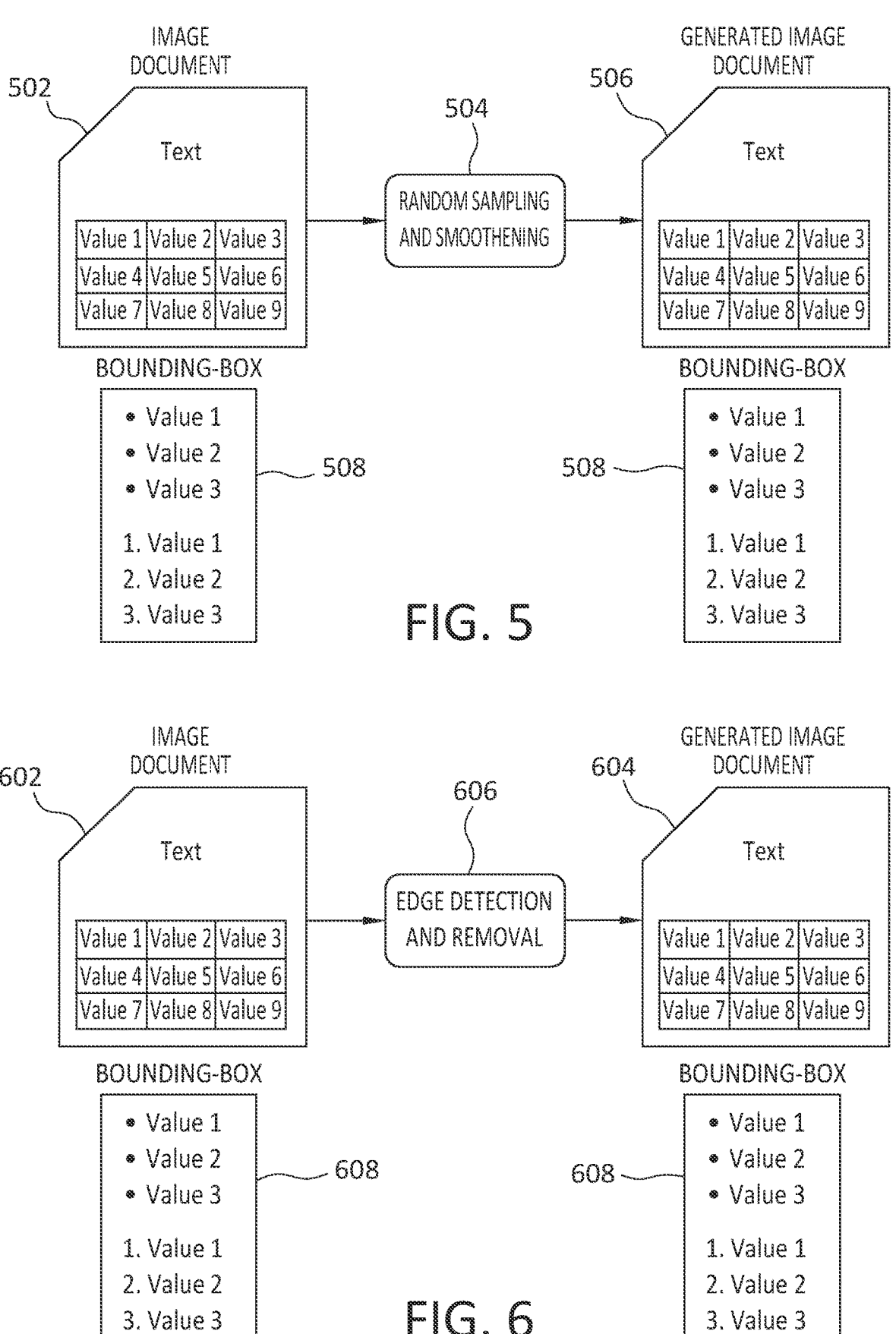
FIG. 5 discloses aspects of an example random patch smoothening process according to one embodiment.
FIG. 6 discloses aspects of an edge detection and removal process according to one embodiment.

With attention now to FIG. 5, aspects of an example embodiment of a random patch smoothening process are disclosed. In particular, and to further diversify the dataset, a random smoothening process may be applied to the images. In an embodiment, this process may comprise randomly selecting, and applying, to an image document 502, different smoothening techniques 504 to different regions within the document images, so as to generate an image document 506 that includes additional variations in image quality. Note that, notwithstanding application of the sampling and smoothening techniques 504, the structures and boundaries within the document images may be preserved, as shown at 508 where the bounding boxes and their respective text have been retained in the new image 506.

Following is a detailed explanation of some example operations included in an embodiment of a random smoothening process, where such operations may include, but are not limited to: random patch selection; smoothening technique selection; patch smoothening; and, iteration and variation. Note that [1] the aforementioned operations may be performed in any order, [2] any combination or grouping of one or more of these operations may be employed in an embodiment, and [3] none of these operations, or any subset of these operations, is required to be performed in any embodiment.

An example random smoothening process may comprise random patch selection. To apply smoothening on random patches, an embodiment may first select random regions within the document images. This may be done, for example, by generating random coordinates (x, y) within the image boundaries, followed by selecting a random patch size (width, height). In an embodiment, the patch size should be chosen carefully to ensure that it is large enough to have a meaningful impact on the image quality, but not so large that it dominates the entire image. The random patch selection process may be repeated multiple times for each image to create multiple regions with varying levels of smoothening.

An example random smoothening process may comprise a smoothening technique selection. For example, an embodiment may choose a smoothening technique to apply to each randomly selected patch. Such smoothening techniques may include, but are not limited to, a Gaussian blur, median filtering, or bilateral filtering. In one or more embodiments, it is possible to either use a single smoothening technique for all patches, or select a different technique for each patch to introduce more diversity in the dataset.

An example random smoothening process may comprise a patch smoothening process. Once the random patches and smoothening techniques are selected, the smoothening may be applied to each patch independently. In an embodiment, this involves extracting the patch from the image, applying the chosen smoothening technique to the patch, and then replacing the original patch in the image with the smoothed patch. In an embodiment, this operation is performed to ensure that the boundaries between the smoothed patch and the surrounding image are blended seamlessly.

An example random smoothening process may comprise Iteration and Variation operations. To further diversify the dataset, a random patch smoothening process may be iterated multiple times, generating different variations of each image. Each iteration may involve selecting new random patches, choosing different smoothening techniques, or adjusting the parameters of the smoothening methods. As a result of the creation of multiple variations of each image, the dataset becomes more diverse and representative of real-world document image qualities.

By applying smoothening on random patches within the images, an embodiment of the invention may create a more diverse and representative dataset for training machine learning models in visual document understanding tasks. This approach enables the models to better handle various levels of image quality and improve their performance and generalization capabilities when applied to real-world document processing tasks.

C.4.5 Edge Detection and Removal

With attention now to FIG. 6, aspects of an example embodiment of an edge detection and removal process are disclosed. In an embodiment, this methodology may comprise identifying and processing tabular data within the document images. This approach may help to generate various image variations by detecting and removing 606 the edges and columns of tables present inside the images 602. Note that, notwithstanding application of the edge detection and removal process 606, the structures and boundaries within the document images 602 may be preserved, as shown at 608 where the bounding boxes and their respective text have been retained in the new image 604.

An embodiment of an edge detection and removal process may be particularly useful for creating diverse training data for models that need to understand documents containing different types of tabular data, such as bordered tables, borderless tables, tables with no edges, and tables without separating lines, for example. In an embodiment, an edge detection and removal process may comprise various operations, including: edge detection; edge removal; and, data augmentation.

In an embodiment, edge detection may comprise detecting the edges and columns of tables within the document images. This may be performed using, for example, edge detection techniques and components, such as the Canny edge detector, Sobel operator, or Hough transform. By identifying the table structures, the system according to an embodiment may effectively process and manipulate the tabular data.

In an embodiment, an edge removal process may be performed. For example, after the edges and columns are detected, the system according to an embodiment may remove the edges and columns to create different variations of the document images. This process May comprise erasing the detected lines, or modifying their appearance in some way, to generate images with varying levels of complexity in the tabular data representation.

In an embodiment, a data augmentation process may be performed. In particular, after removing the edges and columns, the system according to an embodiment may apply additional data augmentation techniques to further diversify the dataset. These techniques may include, but are not limited to, altering the text, images, and annotations, and introducing noise, such as variations in font size, style, and color.

By incorporating the edge detection and removal methodology, a system and method according to one embodiment of the invention may generate a more diverse and representative dataset, particularly for documents containing tabular data. This approach may enable the models to better handle various types of tables and may improve their performance in real-world document processing tasks, as compared with the performance of conventional methods and systems.

D. Further Discussion

As apparent from this disclosure, an embodiment of the invention may possess various useful features and aspects. For example, an embodiment may utilize text-based PDFs for annotation. By using text-based PDFs, the method according to one embodiment of the invention may overcome many of the challenges associated with recognizing text in images, such as poor-quality text and difficult layout.

As another example, an embodiment may comprise and employ annotation-aware OCR. That is, an embodiment may leverage human-generated annotations to improve the OCR accuracy. The annotation data can be used as a training dataset for the OCR system, enabling the OCR system to learn to recognize text that has been highlighted, commented, or otherwise annotated by a user.

Further, an embodiment may implement multi-language support. In particular a method according to one embodiment may be trained on multiple languages, making the method more versatile and useful for a wider range of applications.

Advantageously, a method and system according to one embodiment, may operate to create a synthetic annotated dataset using text-based PDF documents that include annotations added by users. This approach may enable a more diverse range of document layouts and languages to be included in the training dataset, leading to improved OCR accuracy in real-world scenarios.

Further, an embodiment may utilize attention-aware methodology and deep learning architectures to improve recognition accuracy. By training the OCR system on synthetic annotated data, an embodiment may improve recognition accuracy without the need for manual corrections, making it more scalable for large datasets.

Finally, an example embodiment may be adaptable and flexible, and have the ability to create synthetic annotated data in multiple languages and document types. This makes an embodiment of the invention suitable for a wide range of applications, from document scanning and indexing to information retrieval and text-to-speech conversion.

E. Example Methods

It is noted with respect to the disclosed methods, including the example method of FIG. 7, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Figure 7A:
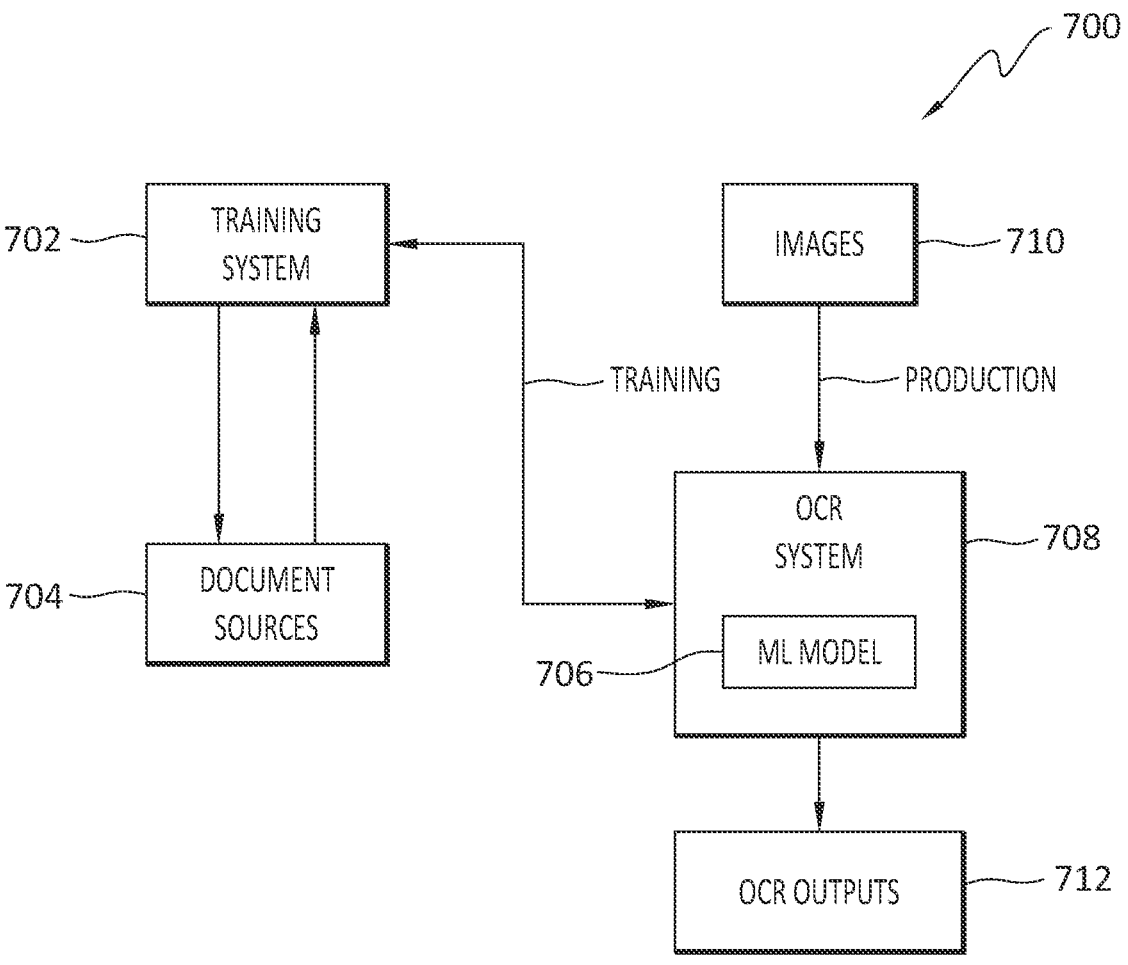
FIG. 7a discloses aspects of an example architecture according to one embodiment.

Directing attention now to FIG. 7a, an example architecture according to one embodiment of the invention is referenced at 700. As shown, a training system 702 may obtain various text-based documents from one or more sources 704. The text-based documents may be processed, using any of the disclosed methods, processes, and operations, to generate a training data set that may be used by the training system 702 to train, as part of a training phase, an ML model 706 of an OCR system 708. The trained ML model 706 may then, in a production phase, receive one or more images 710, such as may have been created by scanning a text document for example. The trained ML model 706 may then perform an OCR process on the images 710 to generate OCR outputs 712. The OCR outputs may include, for example, one or more files that include the text from the images 710 that was identified by the ML model 706. Example files include, but are not limited to, a word processing file, text file, or any other type of text-based document.

Figure 7B:
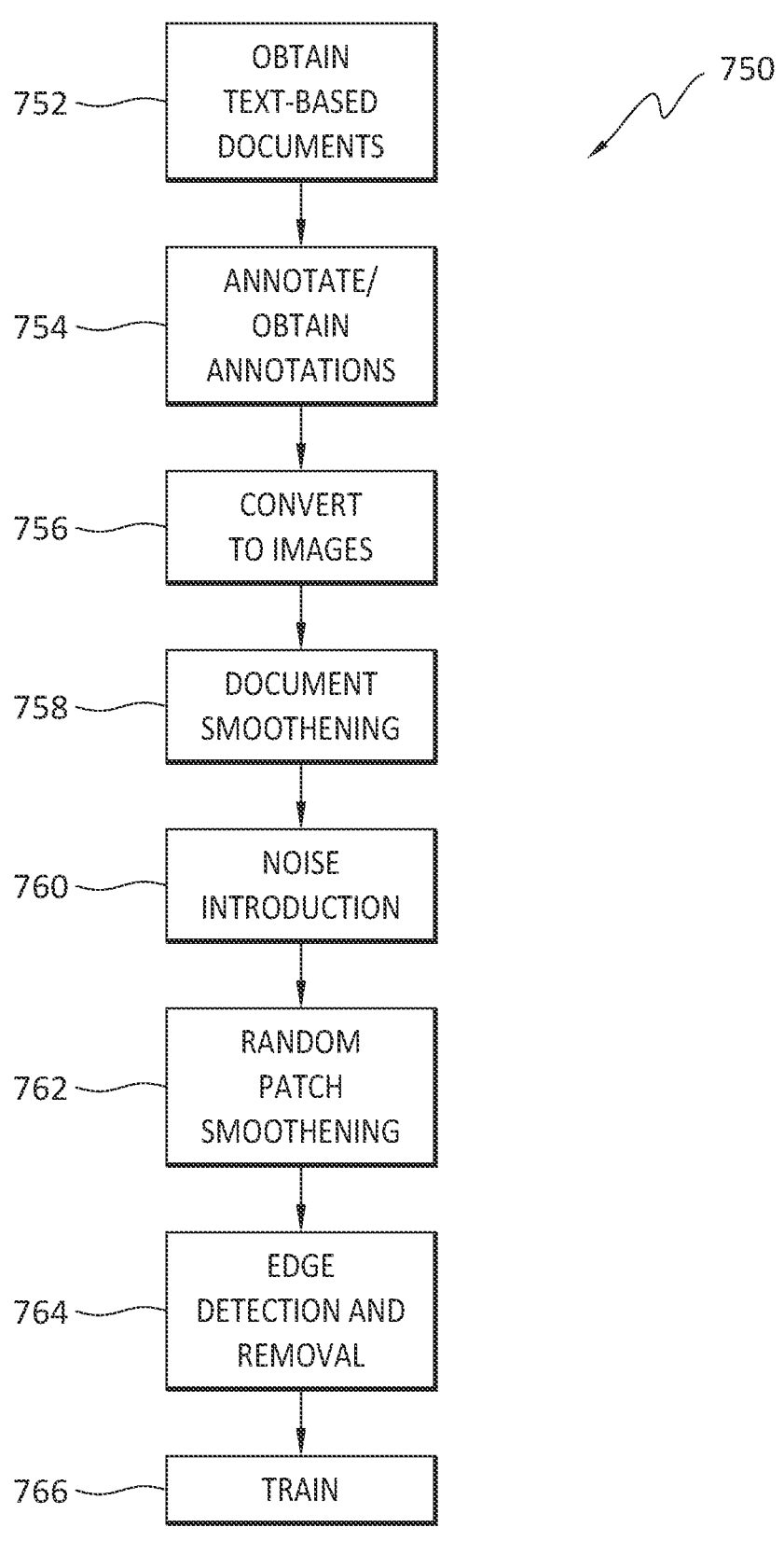
FIG. 7b discloses aspects of an example method according to one embodiment.

Turning next to FIG. 7B, a method according to one example embodiment is indicated at 750. In an embodiment, part, or all, of the method 750 may be performed by and/or at the direction of a training system, that includes data processing functionality, and that is operable to train an OCR system that includes an ML model operable to perform OCR operations with respect to images. The training system may communicate with a data source that includes text-based documents, with the OCR system, and with the ML model of the OCR system.

The method 750 may begin at 752 where one or more text-based documents, such as text-based PDFs for example, are obtained. These text-based documents may or may not include annotations when initially obtained. No particular source(s) for these documents is/are required. After the text-based documents are obtained 752, annotations may be made to the text-based documents and/or annotations may be obtained 754, such as by being copied, from the text-based documents. New annotations made to the text-based documents after the text-based documents have been obtained 752, may likewise be copied from those documents.

After the annotations have been obtained 754, the text-based document(s) including the annotation(s) may then be converted 756 to images. Such images may comprise image files of various types and formations including, for example, .bmp, .jpeg, .jpg, .gif, .svg, and .png.

After the conversion 756, various processes may be performed on the images. As shown in FIG. 7b, the processes may comprise document smoothening 758, noise introduction 760, random patch smoothening 762, and edge detection and removal 764. After the completion of any one or more of these processing operations, the resulting processed image files may be used to train 766 an ML model of an OCR system. The OCR system may then use the trained model to perform recognition operations on images received by the OCR system.

F. Further Example Embodiments

Following are some further example embodiments of the invention. These are presented only by way of example and are not intended to limit the scope of the invention in any way.

Embodiment 1. A method, comprising: obtaining a text-based document; identifying annotations in the text-based document, and retaining those annotations; converting the text-based document to an image; processing the image; creating simulated label data by integrating the processed image with the annotations; and using the processed simulated label data to train a machine learning model of an OCR (optical character recognition) system.

Embodiment 2. The method as recited in any preceding embodiment, wherein the text-based document is a text-based PDF (portable document format) document.

Embodiment 3. The method as recited in any preceding embodiment, wherein the annotations were generated by a human.

Embodiment 4. The method as recited in any preceding embodiment, wherein the annotations comprise text and/or one or more bounding boxes.

Embodiment 5. The method as recited in any preceding embodiment, wherein processing the image comprises performing a document smoothening process on the image.

Embodiment 6. The method as recited in any preceding embodiment, wherein processing the image comprises performing a noise introduction process on the image.

Embodiment 7. The method as recited in any preceding embodiment, wherein processing the image comprises performing a random patch smoothening process on the image.

Embodiment 8. The method as recited in any preceding embodiment, wherein processing the image comprises performing an edge detection and removal process on the image.

Embodiment 9. The method as recited in any preceding embodiment, wherein a verification operation is performed that confirms that the annotations that were retained match the annotations in the image.

Embodiment 10. The method as recited in any preceding embodiment, wherein the processed image is a lower quality version of the text-based document.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 8:
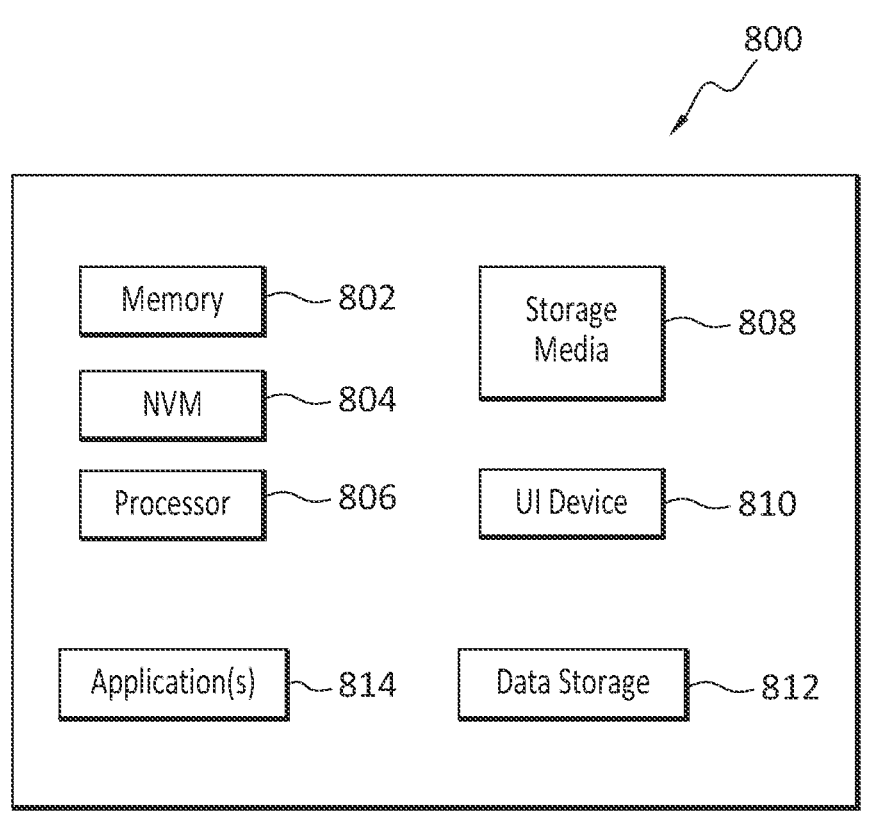
FIG. 8 discloses aspects of a computing entity configured and operable to perform any of the disclosed methods, processes, and operations.

With reference briefly now to FIG. 8, any one or more of the entities disclosed, or implied, by FIGS. 1-7b, and/or elsewhere herein, may take the form of, or include, or be implemented on, or hosted by, a physical computing device, one example of which is denoted at 800. As well, where any of the aforementioned elements comprise or consist of a virtual machine (VM), that VM may constitute a virtualization of any combination of the physical components disclosed in FIG. 8.

In the example of FIG. 8, the physical computing device 800 includes a memory 802 which may include one, some, or all, of random access memory (RAM), non-volatile memory (NVM) 804 such as NVRAM for example, read-only memory (ROM), and persistent memory, one or more hardware processors 806, non-transitory storage media 808, UI device 810, and data storage 812. One or more of the memory components 806 of the physical computing device 800 may take the form of solid state device (SSD) storage. As well, one or more applications 814 may be provided that comprise instructions executable by one or more hardware processors 806 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
obtaining a text-based document;
identifying annotations in the text-based document, and retaining those annotations as native document annotations that exist in the text-based document prior to conversion of the text-based document to an image;
converting the text-based document to an image;
processing the image using one or more image degradation operations selected to simulate low-quality scanned documents, the processing including at least one of document smoothening, noise introduction, random patch smoothening, or edge detection and removal;
creating simulated label data by integrating the processed image with the annotations as training labels by transforming the retained annotations to correspond to the processed image while preserving spatial and semantic alignment between the annotations and document content despite the image degradation; and
using the processed simulated label data to train a machine learning model of an OCR (optical character recognition) system using the annotations as ground-truth labels for the degraded image.

2. The method as recited in claim 1, wherein the text-based document is a text-based PDF (portable document format) document.

3. The method as recited in claim 1, wherein the annotations were generated by a human.

4. The method as recited in claim 1, wherein the annotations comprise text and/or one or more bounding boxes.

5. The method as recited in claim 1, wherein processing the image comprises performing a document smoothening process on the image.

6. The method as recited in claim 1, wherein processing the image comprises performing a noise introduction process on the image.

7. The method as recited in claim 1, wherein processing the image comprises performing a random patch smoothening process on the image.

8. The method as recited in claim 1, wherein processing the image comprises performing an edge detection and removal process on the image.

9. The method as recited in claim 1, wherein a verification operation is performed that confirms that the annotations that were retained match the annotations in the image.

10. The method as recited in claim 1, wherein the processed image is a lower quality version of the text-based document.

11. A non-transitory storage medium having stored therein instructions that are executable by one or more hardware processors to perform operations comprising:

obtaining a text-based document;

identifying annotations in the text-based document, and retaining those annotations as native document annotations that exist in the text-based document prior to conversion of the text-based document to an image;

converting the text-based document to an image;

processing the image using one or more image degradation operations selected to simulate low-quality scanned documents, the processing including at least one of document smoothening, noise introduction, random patch smoothening, or edge detection and removal;

creating simulated label data by integrating the processed image with the annotations as training labels by transforming the retained annotations to correspond to the processed image while preserving spatial and semantic alignment between the annotations and document content despite the image degradation; and using the processed simulated label data to train a machine learning model of an OCR (optical character recognition) system using the annotations as ground-truth labels for the degraded image.

12. The non-transitory storage medium as recited in claim 11, wherein the text-based document is a text-based PDF (portable document format) document.

13. The non-transitory storage medium as recited in claim 11, wherein the annotations were generated by a human.

14. The non-transitory storage medium as recited in claim 11, wherein the annotations comprise text and/or one or more bounding boxes.

15. The non-transitory storage medium as recited in claim 11, wherein processing the image comprises performing a document smoothening process on the image.

16. The non-transitory storage medium as recited in claim 11, wherein processing the image comprises performing a noise introduction process on the image.

17. The non-transitory storage medium as recited in claim 11, wherein processing the image comprises performing a random patch smoothening process on the image.

18. The non-transitory storage medium as recited in claim 11, wherein processing the image comprises performing an edge detection and removal process on the image.

19. The non-transitory storage medium as recited in claim 11, wherein a verification operation is performed that confirms that the annotations that were retained match the annotations in the image.

20. The non-transitory storage medium as recited in claim 11, wherein the processed image is a lower quality version of the text-based document.

* * * * *